US011443492B2

(12) United States Patent
Fradet et al.

(10) Patent No.: US 11,443,492 B2
(45) Date of Patent: Sep. 13, 2022

(54) SHARING VIRTUAL CONTENT IN A MIXED REALITY SCENE

(71) Applicant: InterDigital CE Patent Holdings, Paris (FR)

(72) Inventors: Matthieu Fradet, Chanteloup (FR); Caroline Baillard, Cesson-Sévigné (FR); Anthony Laurent, Vignoc (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 17/253,543

(22) PCT Filed: Jun. 13, 2019

(86) PCT No.: PCT/EP2019/065521
§ 371 (c)(1),
(2) Date: Dec. 17, 2020

(87) PCT Pub. No.: WO2019/243160
PCT Pub. Date: Dec. 26, 2019

(65) Prior Publication Data
US 2021/0272373 A1 Sep. 2, 2021

(30) Foreign Application Priority Data

Jun. 19, 2018 (EP) .................................. 18305761

(51) Int. Cl.
*G06F 3/04815* (2022.01)
*H04L 67/131* (2022.01)
*G06T 19/00* (2011.01)
(52) U.S. Cl.
CPC ........ *G06T 19/006* (2013.01); *G06F 3/04815* (2013.01); *H04L 67/131* (2022.05)

(58) Field of Classification Search
CPC .... G06T 19/006; G06F 3/04815; H04L 67/38
See application file for complete search history.

(56) References Cited

U.S. PATENT DOCUMENTS

2012/0249416 A1 10/2012 Maciocci
2013/0083173 A1* 4/2013 Geisner .................. G09G 3/003
348/51

(Continued)

FOREIGN PATENT DOCUMENTS

WO 2015125066 8/2015
WO 2017021587 2/2017

OTHER PUBLICATIONS

Mollet Nicolas, "Embodiment & Multi-users VR Media". Technicolor, YouTube link available at: https://www.youtube.com/watch?v=UyaS0tffUAI, published Feb. 21, 2017.

(Continued)

*Primary Examiner* — Jitesh Patel
(74) *Attorney, Agent, or Firm* — Invention Mine LLC

(57) ABSTRACT

A method of sharing and a method of presenting virtual content in a mixed reality scene rendered on at least two user devices having different viewing position and/or orientation onto the mixed reality scene and corresponding apparatus are described. At a first user device, a user is enabled to select a virtual content to be shared and a second user device with whom the virtual content is to be shared. Information related to the virtual content to be shared is provided, wherein the provided information comprises the 3D position of the virtual content to be shared. The information is received by the second user device and the shared virtual content is rendered with regard to the viewing position and/or orientation of the second user device onto the mixed reality scene.

20 Claims, 10 Drawing Sheets

(56) References Cited

U.S. PATENT DOCUMENTS

| | | | | |
|---|---|---|---|---|
| 2014/0267234 | A1* | 9/2014 | Hook | G06T 19/006 |
| | | | | 345/419 |
| 2015/0040034 | A1* | 2/2015 | Kyogoku | G06F 3/04842 |
| | | | | 715/753 |
| 2016/0104452 | A1* | 4/2016 | Guan | G06T 19/006 |
| | | | | 345/633 |
| 2016/0225189 | A1* | 8/2016 | Nishizawa | G02B 27/017 |
| 2017/0039770 | A1* | 2/2017 | Lanier | H04W 12/06 |
| 2019/0081993 | A1* | 3/2019 | Shim | G06F 3/04842 |
| 2019/0114802 | A1* | 4/2019 | Lazarow | G06F 1/163 |

OTHER PUBLICATIONS

International Search Report and Written Opinion of the International Searching Authority for PCT/EP1019/065521 dated Jul. 16, 2019, 12 pages.

International Preliminary Report on Patentability for PCT/EP2019/065521 dated Dec. 22, 2020, 8 pages.

* cited by examiner

SHARING VIRTUAL CONTENT IN A MIXED REALITY SCENE

The present application is a national stage application under 35 U.S.C. § 371 of International Application No. PCT/EP2019/065521, entitled "SHARING VIRTUAL CONTENT IN A MIXED REALITY SCENE," filed on Jun. 13, 2019, which claims benefit from European Patent Application Serial No. 18305761.1, entitled "SHARING VIRTUAL CONTENT IN A MIXED REALITY SCENE," filed Jun. 19, 2018.

TECHNICAL FIELD

The present principle relates to a method of sharing virtual content in a mixed reality scene rendered on a first user device and a method of presenting the shared virtual content on at least a second user device, wherein the at least two devices have different viewing positions and/or orientations onto the mixed reality scene.

BACKGROUND

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

The significant increase in performance and speed of computers, graphics cards and processors, the evolution of displays, and the development of completely new mobile devices have resulted in many applications for Virtual Reality (VR) and Mixed Reality (MR) technologies, both being part of the so-called Mediated Reality. MR is a mix of reality and virtual reality, i.e. the merging of real and virtual content, encompassing both Augmented Reality (AR) and Augmented Virtuality (AV).

VR enables a user to experience a virtual, surrounding 3D digital world with suitable tools, to view it from different sides, to move around in it and possibly even to interact with it. In the VR environment, the user no longer perceives his real environment or only to a very limited degree.

AR is an enrichment of the real world perceived by the user through virtual content, especially in the form of texts, graphics, animations, videos, static or moving 3D objects. The user typically perceives the virtual content on a display where it is merged into the real world. Correspondingly, AV refers to the merging of real world content into a predominantly virtual world.

For the presentation of MR/VR content, different devices can be used such as mobile devices having a display like mobile phones or computer tablets. In this case, a MR presentation is made possible by displaying the virtual content on the display together with the real environment recorded by a camera of the respective device. Another example for a device displaying MR/VR content is a head-mounted display (HMD), which is worn by a user like normal glasses, but has one or more projection or displaying units to project images in front of the eyes or directly on the retina. Depending on whether the head-mounted display is for VR or MR content, the wearer can perceive only the virtual surrounding 3D digital world or also the surrounding real environment. As another example, AR content can also be displayed by a projection of virtual content on transparent surfaces that allow a view of the real world, such as windows.

While for many of today's applications the MR/VR content is only presented to a single user, there is also an increasing interest in simultaneous participation of several users in the same MR/VR scene and to share between these users a virtual content contained in the MR/VR scene.

A method for sharing mediated reality content is disclosed in WO 2017/021587 A1. The mediated reality content is displayed by a device and a further device is identified with which at least a portion of the mediated reality content is to be shared. One or more parameters characterizing a display associated with the further device and a portion of the mediated reality content to be shared with the further device are determined. The portion of the mediated reality content is shared with the further device.

SUMMARY

In a first aspect, a method of sharing virtual content in a mixed reality scene rendered on at least two user devices having different viewing positions and/or orientations onto the mixed reality scene is described. The method comprises, at a first user device:
  enabling a user to select a virtual content to be shared and a second user device with whom the virtual content is to be shared; and
  providing information related to the virtual content to be shared with the second user device, wherein the provided information comprises the 3D position of the virtual content to be shared.

In a second aspect, a method of presenting virtual content in a mixed reality scene rendered on at least two user devices having different viewing positions and/or orientations onto the mixed reality scene is described. The method comprises, at a second user device:
  receiving from a first user device information related to a virtual content in the mixed reality scene, which is shared by the first user device with the second user device, wherein the received information comprises the 3D position of the virtual content to be shared; and
  rendering the shared virtual content with regard to the viewing position and/or orientation of the second user device onto the mixed reality scene.

In a third aspect, an apparatus for sharing virtual content in a mixed reality scene rendered on at least two user devices having different viewing positions and/or orientations onto the mixed reality scene is described. The apparatus comprises:
  means for enabling a selection of a virtual content to be shared and of a second user device with whom the virtual content is to be shared; and
  means for providing information related to the virtual content to be shared to the second user device, wherein the provided information comprises the 3D position of the virtual content to be shared.

In a fourth aspect, an apparatus for presenting virtual content in a mixed reality scene rendered on at least two user devices having different viewing positions and/or orientations onto the mixed reality scene is described. The apparatus comprises:
  means for receiving from a first user device information related to a virtual content in the mixed reality scene which is shared by the first user device with the second user device, wherein the received information comprises the 3D position of the virtual content to be shared; and means for rendering the shared virtual content with regard to the viewing position and/or orientation of the second user device onto the mixed reality scene.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

The proposed method and apparatus is best understood from the following detailed description when read in conjunction with the accompanying drawings. The drawings include the following figures briefly described below.

Figure 1:
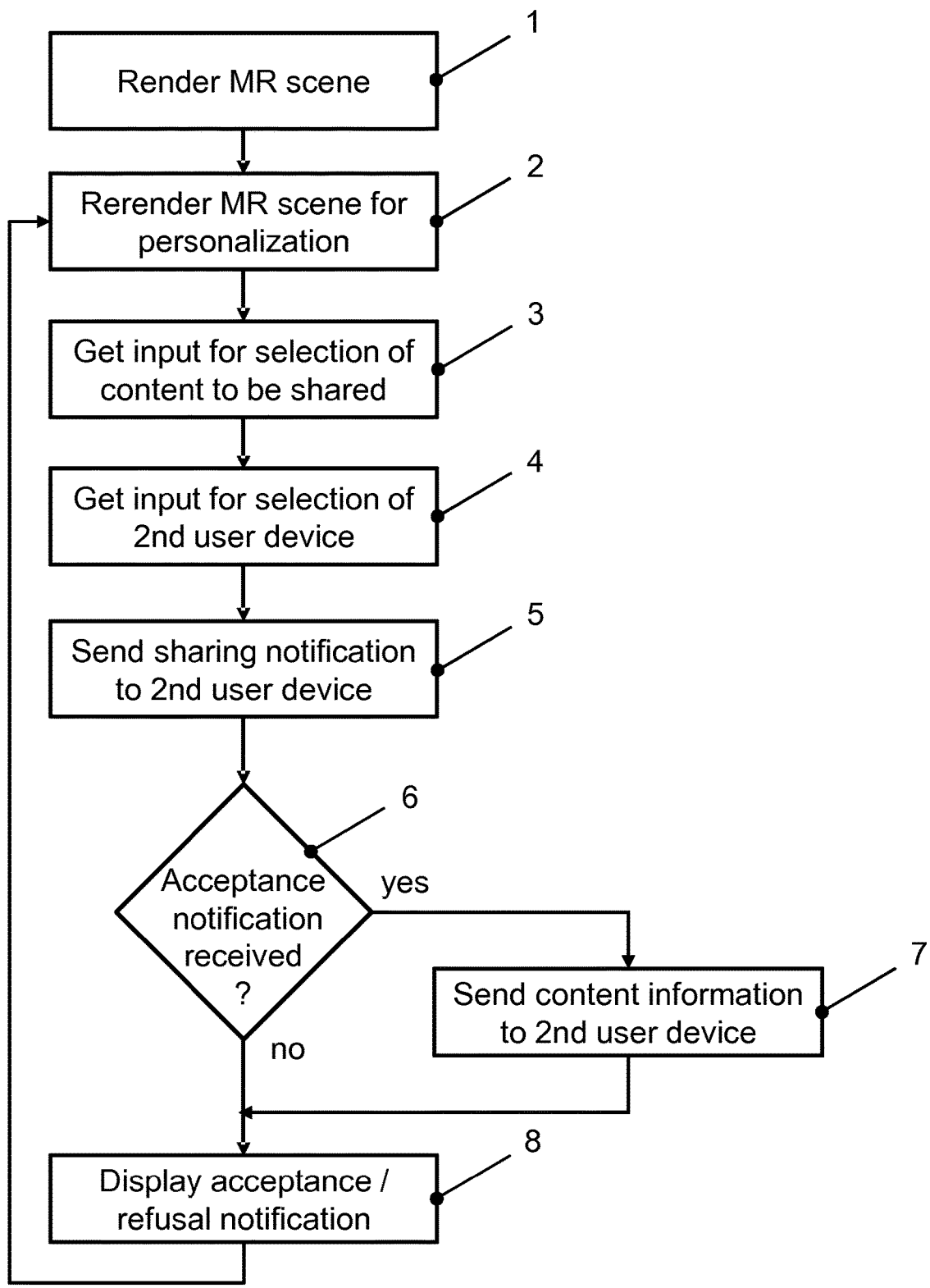
FIG. 1 illustrates a flowchart of an exemplary method of sharing virtual content in a mixed reality scene in accordance with one embodiment of the present disclosure.

It should be understood that the drawings are for purposes of illustrating the concepts of the disclosure and are not necessarily the only possible configuration for illustrating the disclosure.

DETAILED DESCRIPTION

All examples and conditional language recited herein are intended for educational purposes to aid the reader in understanding the principles of the disclosure and the concepts contributed by the inventor to furthering the art, and are to be construed as being without limitation to such specifically recited examples and conditions.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It will be appreciated by those skilled in the art that the flow diagrams represent various processes, which may be executed by a computer or processor, whether or not, such computer or processor is explicitly shown. Similarly, it will be appreciated that the block diagram presented herein represents a conceptual view of an illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function.

In an embodiment, a method of sharing virtual content in a mixed reality scene rendered on at least two user devices having different viewing positions and/or orientations onto the mixed reality scene may include, at a first user device:

enabling a user to select a virtual content to be shared and a second user device with whom the virtual content is to be shared; and providing information related to the virtual content to be shared to the second user device, wherein the provided information comprises the 3D position of the virtual content to be shared.

In some embodiments, the method may also include:

rendering the content to be shared on the first user device using the viewing position and/or orientation of the first user device and the 3D position of the content to be shared.

In some embodiments, said enabling may also include receiving a user input for selecting the content to be shared in the rendered mixed reality scene.

In some embodiments, the mixed reality scene rendered on the first user device may also include the second user device and/or a user of the second user device and/or a graphical symbol representing the second user device or user and said enabling may also include detecting a user input for selecting the rendered user device, user or graphical symbol in the rendered mixed reality scene.

Some embodiments may also include that the mixed reality scene is rendered on a touchscreen of the first user device and that the detected user input is a gesture performed by a user on the touchscreen.

In some embodiments, the performed gesture may also include:
- selecting the content to be shared by touching the touchscreen at the location of the displayed content to be shared;
- dragging the selected content to the location of the rendered user device, user or graphical symbol; and
- sharing the selected content by dropping it onto the rendered user device, user or graphical symbol.

In some embodiments, the method may also include that the second user device and/or user of the second user device is represented by a 3D shape.

Turning now to FIG. 1, a flowchart of an exemplary method of sharing virtual content in a mixed or virtual reality scene is shown and discussed in detail. In general, the virtual content to be shared can encompass any kind of signal, which can affect the human body and can be perceived by a person through the sense organs, like visual, audible or tactile signals.

However, since visual perceptible content is most common in today's MR/VR content, in the following description the virtual content to shared represents such displayable content.

Figure 5:
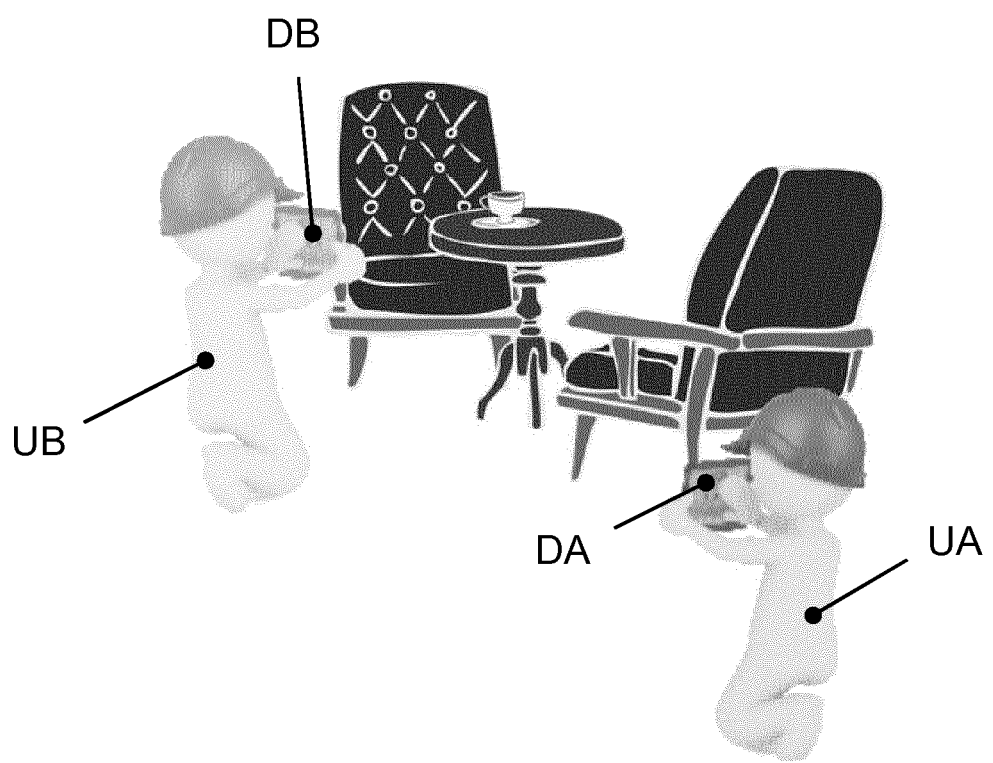
FIG. 5 illustrates a first and a second user, each observing the same environment with their own user device.

The method is performed by a first user device of a first user. With reference to FIG. 5, the first user device is in the following also labeled with DA, the first user with UA, and similarly a second user device with DB and a second user with UB.

The first user device can be any kind of MR device, which allows the rendering of visual content, for example, a mobile phone, a tablet computer, or a head mounted device.

Initially, in step 1 the first user device DA renders a MR scene, which is displayed on a display of the first user device DA so that it can be viewed by the first user UA. The MR scene can be any kind of mixture between real and virtual content, an example of which is given below in FIG. 8. Instead of performing the rendering in the first user device DA, part or all of the rendering could also be performed remotely by a rendering server or rendering farm.

The first user UA now personalizes the MR scene. Such a personalization can encompass for example one or more of the following amendments of parts of the scene: change of the 3D location, the 3D orientation, the scale, the geometry, the color, or the texture of a virtual object. Furthermore, new virtual content can be created or downloaded or existing content can be removed. The processed virtual content could be any kind of visual perceptual content like a 3D graphic object, a 2D image, text, or a video clip. The personalized MR scene is rerendered in step 2 so that the first user UA can look at the amended MR scene.

Once satisfied with the personalized MR scene, the first user UA may want to allow one or more other users having their own MR device and having access to same MR scene to view the personalized MR scene, i.e. the first user UA may want to share the processed virtual content. The first user UA and the one or more other users could all physically be in the same room, viewing and possibly collaborating on the same MR scene but could also be in different rooms, in particular in a VR environment. All users may simultaneously personalize their own version of the scene and decide if they want to share, when they want to share, if they want to share all or only part of the personalized scene, and whether to share with one of, some of or all the other users. However, for the sake of simplicity, in the following only a single other user, a second user UB using a second user device DB, is considered.

In particular, if the first user UA has made several amendments to the MR scene, and only wants to share a part of the amendments with second user UB, he has to select the piece of content he wants to share. For this purpose, the first user UA has to input the selection of the content to be shared, which is received by his user device DA in step 3. While various input means for receiving the user input can be implemented in the user device, the use of a touchscreen is particularly suitable for mobile devices such as a mobile phone or a tablet computer. In case of a head-mounted display, the user input can be detected by using head and eye tracking technology.

If there is more than one other user and the first user UA does not want to share the personalized content with all the other users, he has to identify and select the user device(s) he wants to share the content with. The corresponding input of first user UA is received by his user device DA in step 4, wherein the same input means as for the preceding step 3 can be used.

While in the above the first content to be shared has been selected in step 3, followed by the selection of the second user device with whom to share in step 4, the selection could also be performed in the reverse order.

After the first user UA has selected both the content to be shared and the other user device DB, his user device DA sends in step 5 a notification to the other user device DB, either directly or via a server, and then waits for a response from user device DB.

In the following step 6, user device DA checks whether an acceptance notification is received from the other user device DB, wherein the acceptance notification is a confirmation that user UB has accepted the sharing and may include a request for various kinds of information related to the specific content to be shared. If an acceptance notification is received, user device DA sends in step 7 directly or via the server the required information, which can be one or more of the following data: an identifier that identifies the object to be shared, the location, the orientation, the scale, the color, or the texture of the virtual content.

Furthermore, in step 8, a notification can be given to the first user UA informing him that the other user UB now sees the shared content or that user UB declined the sharing, e.g. by displaying a corresponding message on the display of user device DA. After that, the method can return to step 2 in order to allow further sharing of additional content personalized by the first user UA. The method also continues in step 2 if instead of an acceptance notification a refusal notification is received from user device DB, or if no notification is received at all within a certain time period after sending the notification to the other user device DB in step 5.

In an embodiment, a method of presenting virtual content in a mixed reality scene rendered on at least two user devices having different viewing positions and/or orientations onto the mixed reality scene may include, at a second user device:
- receiving from a first user device information related to a virtual content in the mixed reality scene which is shared by the first user device with the second user device, wherein the received information comprises the 3D position of the virtual content to be shared; and rendering the shared virtual content with regard to the viewing position and/or orientation of the second user device onto the mixed reality scene.

In some embodiments, the method may also include:
receiving a notification that the first user device wants to share virtual content;
detecting a user input accepting or declining the sharing of the virtual content; and
wherein the shared virtual content is only rendered if a user input accepting the sharing is detected.

In some embodiments the method may also include that the at least two user devices exchange information via a server.

In some embodiments, the method may also include that a user device, when being turned on, requests from the server at least one of the following data:
a scene configuration of the mixed reality scene;
position data for the current location of the other user devices; or
a list of sharable virtual content.

Figure 2:
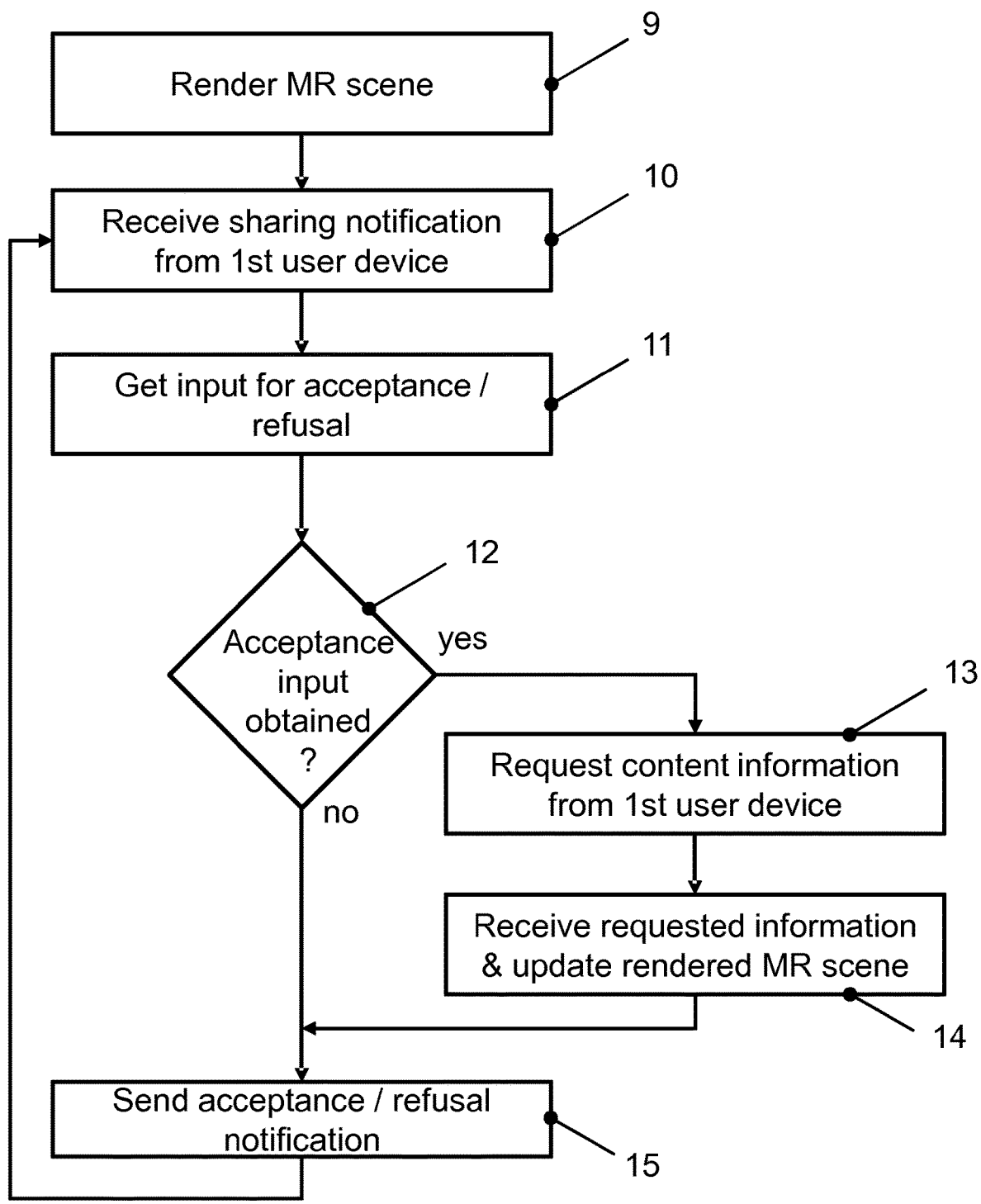
FIG. 2 illustrates a flowchart of an exemplary method of presenting the shared virtual content on a second user device in accordance with one embodiment of the present disclosure.

FIG. 2 illustrates a flowchart of an exemplary method of presenting the shared virtual content on a second user device in accordance with one embodiment of the present disclosure. The method is performed by a second user device DB of the second user UB. Like the first user device DA, also the second user device DB can be any kind of MR device, which allows the rendering of visual content, and can be of the same type or of different type as the first user device.

Also, this method starts with a rendering step 9 of a MR scene, which is displayed on a display of the second user device DB so that it can be viewed by the second user UB. The MR scene can be the same as the one also originally rendered on the first user device DA of the first user UA, i.e. before any personalization. Just as well, the second user UB can also have personalized the original MR scene already on his part. On the other hand, content already personalized by the first user UA has not yet been communicated to the second user device DB and thus is not taken into account in rendering step 9.

The second user UB now receives in step 10 a sharing notification from the first user device DA, informing him that the first user UA wants to share content being part of a personalization of the MR scene by the first user UA. This notification can be displayed on the screen of the second user device DB as shown in FIG. 7 and explained in more detail in the corresponding description. Instead of or in addition to displaying such a notification message, also other means for informing the second user UB can be used such as an illuminated LED, a voice output or causing the second user device to vibrate.

In the following step 11, the second user device DB now obtains an input by the second user UB, accepting or declining the offer to receive the personalized content of the first user UA. Various input means can be used for that, like a touch screen on which icons for accepting or declining the offer are displayed, manual input elements like buttons, or a voice control unit.

The second user device DB then checks in step 12 whether the command received from the second user is a command to accept or refuse the sharing offer.

If an input to accept the sharing offer has been obtained, user device DB sends in step 13, directly or via a server, a request for information required for rendering the content to be shared.

In the following step 14, the requested information is received by user device DB. Once the user device DB has received all shared information, the corresponding virtual content is created if it was missing so far from the MR scene observed by user UB, or updated according to the personalization by the first user UA, if it was already present in the MR scene observed by user UB. Subsequently, the updated MR scene is rendered on user device DB with the content shared by user device DA, taking into account the point of view of the second user UB on the MR scene and the environment.

Finally, in step 15, a notification is sent to the first user device DA with an information that the shared content is rendered on the second user device DB or that the second user UB has declined the sharing. After that, the method can return to step 10 so that further sharing notifications can be received.

FIG. 3 illustrates three MR rendering devices DA, DB, DC with an exchange of sharing information between two of them. The number of MR rendering devices is just an example, there could be various numbers of MR rendering devices and an exchange of information between more than two of them. Furthermore, even though the MR rendering devices are all depicted in the figure by the same graphical representation, they can be implemented in different technical devices, for example, the first one in a mobile phone, the second one in a tablet computer, and the third one in a head mounted device. These devices exchange information by wireless communication such as Wi-Fi or through a wired connection.

Figure 3A:
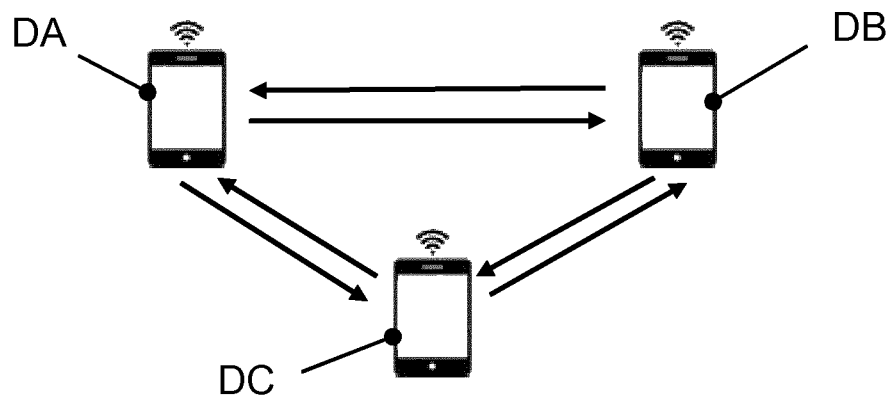
FIG. 3 illustrates three MR rendering devices with an exchange of sharing information between two of them.

As depicted in FIG. 3A, each of the three MR rendering devices exchanges information such as the current 3D location, the configuration of the MR scene or a list of sharable contents with the other two MR rendering devices. The 3D location is given by a (X, Y, Z) triplet in the "world coordinates system" of the MR scene, which can be determined by positional tracking technologies. The information can be exchanged, when the respective MR rendering device is turned on, either completely or only partially, with a completion when specifically requested or an update of information in regular or irregular time intervals.

Figure 3B:
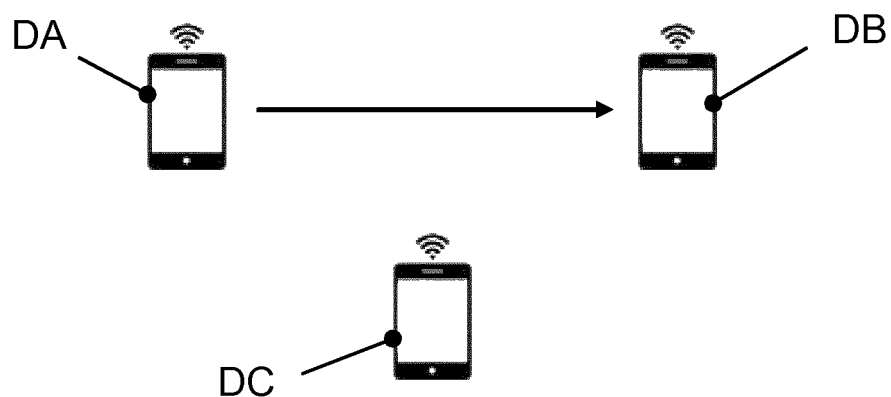

If a first user UA now wants to share content with a second user UB, his first user device DA sends a sharing notification to the second user device DB, as depicted in FIG. 3B. Since the first user has no intention to share the content with a user of a third user device DC, no sharing notification is sent to the third user device DC. In case that a preview of the content to be shared shall be rendered on the second user device DB, the information sent to the second user device DB has to include information related to the virtual content to be shared like an identifier of a 3D model, the location, orientation, scale, a texture ID or color information. Furthermore, if the 3D model ID and/or the texture ID are not recognized by the second user device DB, a low-resolution model and a low-resolution texture map can be sent too.

Figure 3C:
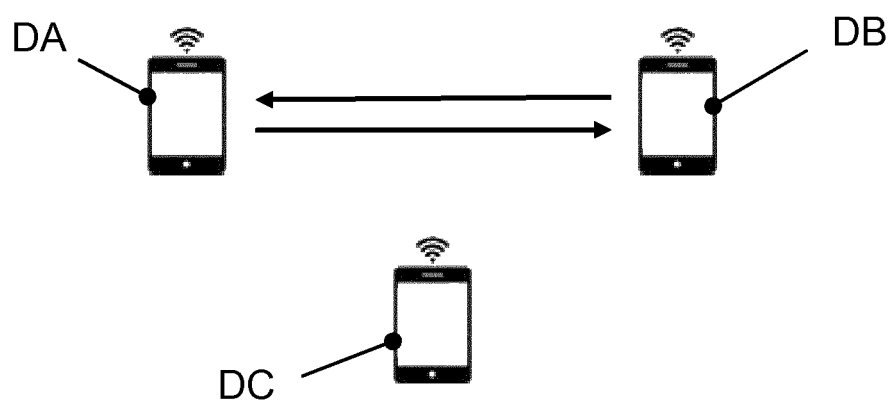

FIG. 3C shows the data exchange between the first user device DA and the second user device DB once sharing has been accepted. Following a request from the second user device DB for information related to the content to be shared, the first user device DA retrieves the requested information and sends it back to the second user device DB. If the requested information includes a 3D model ID and a texture ID, which is not recognized by the second user device DB, a full-resolution model and a full-resolution texture map should be sent too.

Instead of directly communicating with each other, the MR rendering devices can also exchange sharing information via a server as illustrated in FIG. 4. Again, the MR rendering devices can be different technical devices and can be connected wireless or wired. The server may be for example a computer or a cluster of computers, a set-top-box, or a gateway and can also communicate wireless or wired with the MR rendering devices.

Figure 4A:
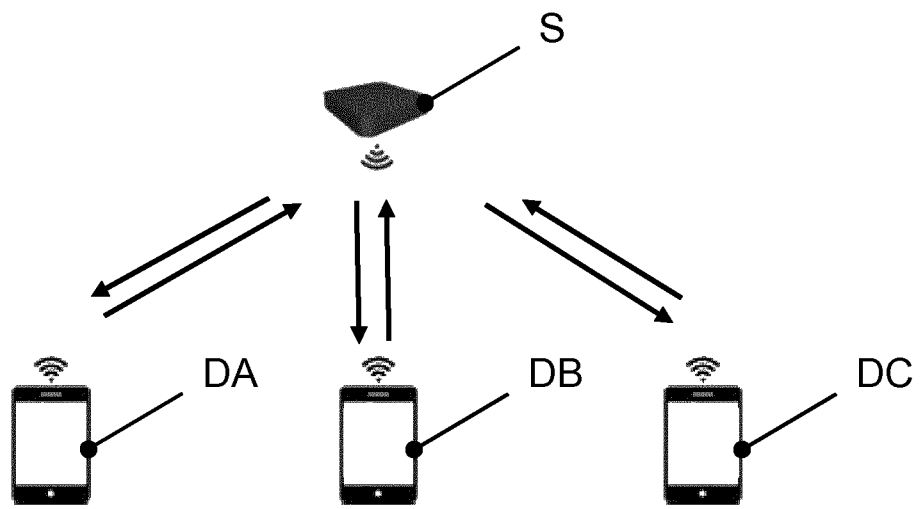
FIG. 4 illustrates two MR rendering devices and a server with an exchange of sharing information between the two MR devices via the server.

As depicted in FIG. 4A, three MR rendering devices DA, DB, DC exchange information through the server S. Each of the three MR rendering devices sends requests for information such as the current location, the configuration of the MR scene or a list of sharable contents to the server, e.g. when a particular MR rendering device is turned on. In return, the server sends the requested information.

Figure 4B:
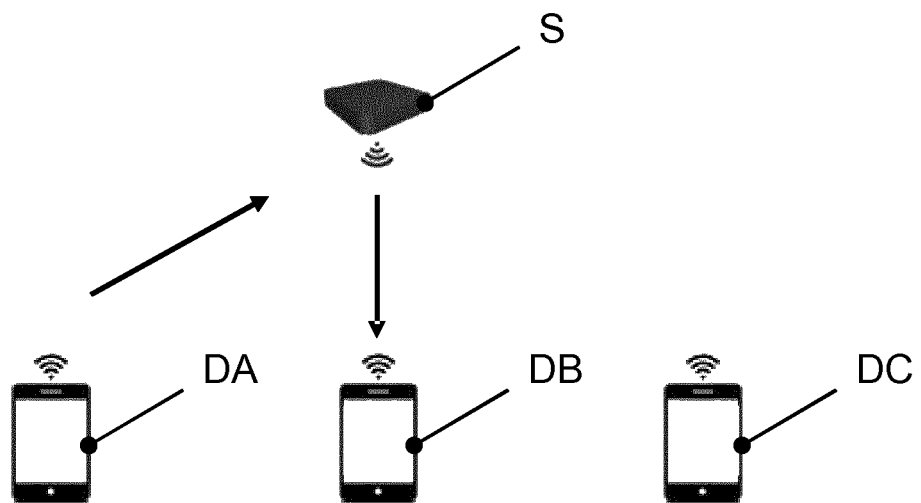

As illustrated in FIG. 4B, for sharing content from a first user device DA with a second user device DB, a sharing notification and information on the content to be shared is sent from the first user device DA to the server S. The server S then forwards the sharing notification to the second user device DB. The information on the content to be shared is temporarily stored at the server and not yet forwarded since it is not yet known whether the second user will accept the sharing offer. In this way, unnecessarily occupying transmission bandwidth and wasting memory space of the second user device DB for content, which finally will not be rendered at the second user device DB, can be avoided.

Figure 4C:
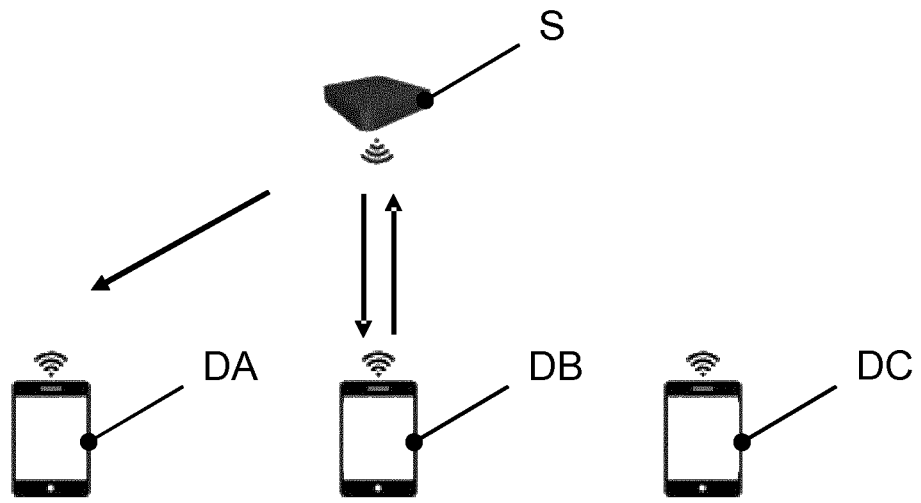

FIG. 4C shows the data exchange between the first user device DA and the second user device DB via the server S if the sharing has been accepted by the second user. In this case, the second user device DB sends a request for the required information related to the content to be shared to the server, which now forwards the buffered information on the content to be shared to the second user device DB. Furthermore, the server S sends a notification about the acceptance or refusal of the sharing to the first user device DA.

An example for a situation where two users observe the same MR scene from different viewing positions with their respective user devices is illustrated in FIG. 5. The users UA and UB are physically in the same room, enjoying a MR experience that allows them to virtually add different models of armchairs to a real set consisting of two armchairs and a coffee table using their MR rendering devices DA and DB.

Figure 6A:
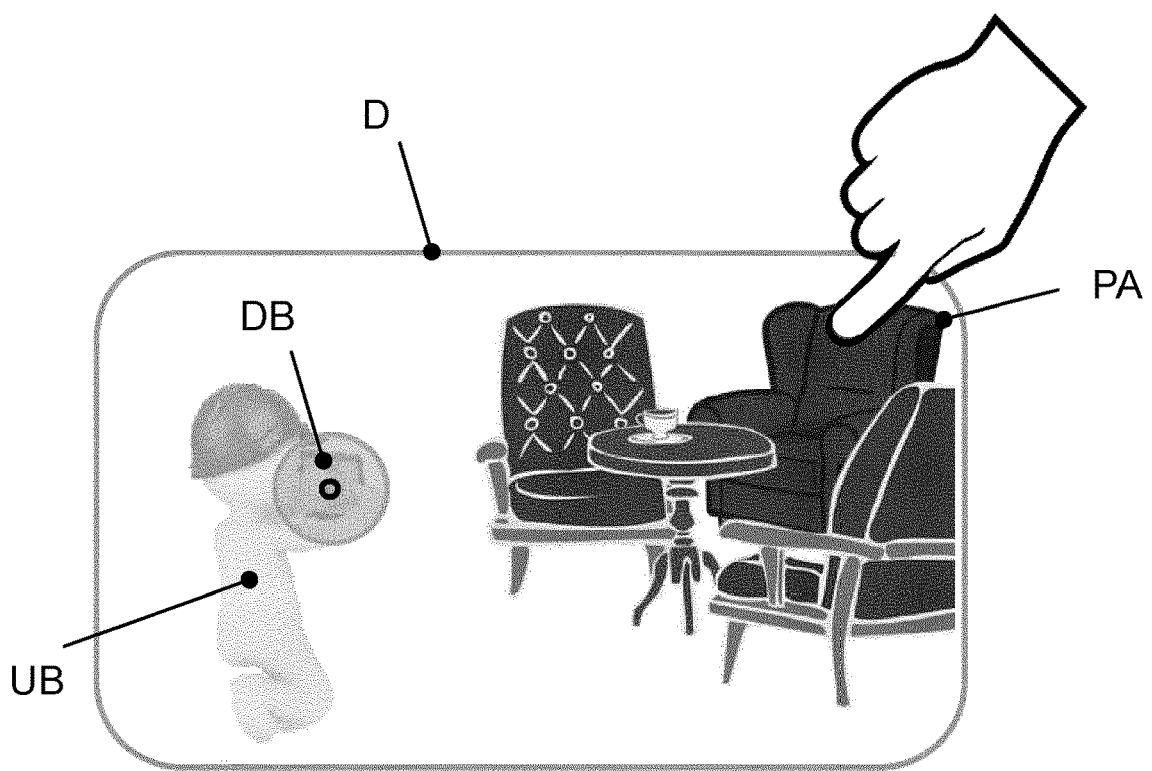
FIG. 6 illustrates a method for selecting both a content to be shared in a displayed MR scene and a user with whom to share using a touchscreen display.

FIG. 6 illustrates an embodiment, which conveniently allows to select both a content to be shared and a user with whom to share using a touchscreen display. In this example, the rendered view of the MR scene on the display D of the touchscreen of the user device of the first user is shown. The first user has personalized his scene by virtually adding an armchair PA. If the user wants to share this virtually added armchair PA, he can select it simply by pointing with his index finger on it, as shown in FIG. 6A.

Figure 6B:
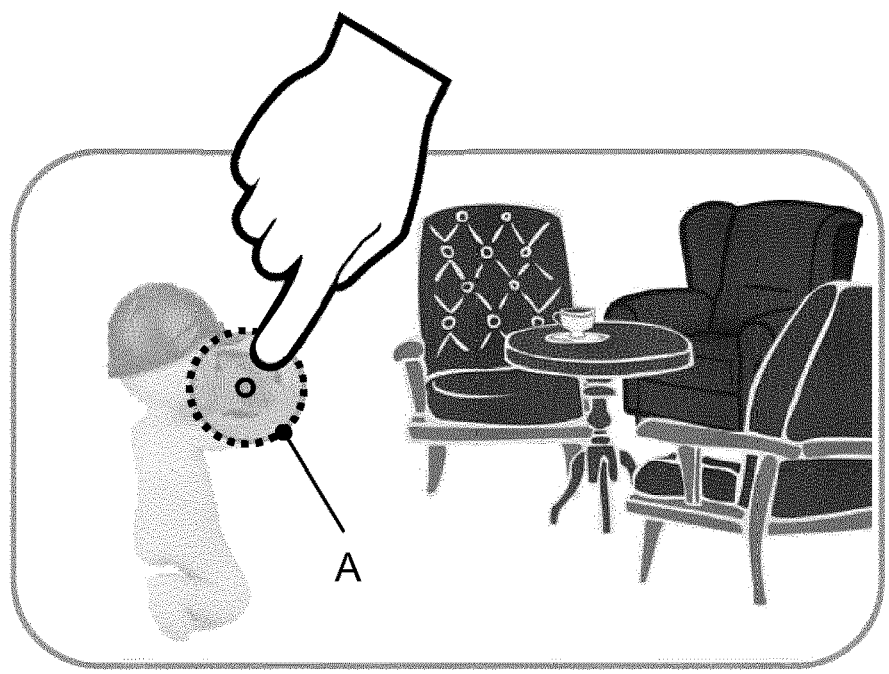

The second user UB carrying his user device DB is also depicted on the display D. The point in the middle of the user device DB symbolizes the projection of the 3D location (X, Y, Z) of the camera of the user device DB. For sharing the virtually added armchair PA with the second user UB, the first user now moves his fingertip on the touchscreen to the depiction of the second user device DB, as shown in FIG. 6B, and drops it by removing the finger at this position.

In that way, using the camera pose of the first user device DA and its intrinsic parameters, the 3D location of the content to be shared and the camera pose of the second user device DB, and using well-known 3D projections, the selection and dragging of a sharable content and its dropping onto the second user device DB can be detected. One way to estimate, which element is being touched, is using so-called raycasting techniques.

Since it might be difficult to do the dropping exactly at the point of the 3D location of the camera of the second user device DB, an area for dropping A around it can be defined. The area for dropping may be a 3D shape, e.g. a sphere or a cube, with a dimension suitable for making an interaction easier. To point this out to the first user an indication of the area for dropping can be shown to the first user on the display of the first user device.

When the final position of the finger is detected as being inside the projection of the sphere/cube containing the camera of the second user device DB, the first user device DA sends a notification to the device DB or to the server as mentioned above to inform the second user UB that the first user UA wants to share content with him.

FIG. 7 illustrates some examples of on screen information displayed to the second user UB notifying him that another user wants to share content with him. In the shown examples, the second user UB has himself also virtually added a piece of content PB, which is displayed in his view of the MR scene and is also in the form of an armchair.

Figure 7A:
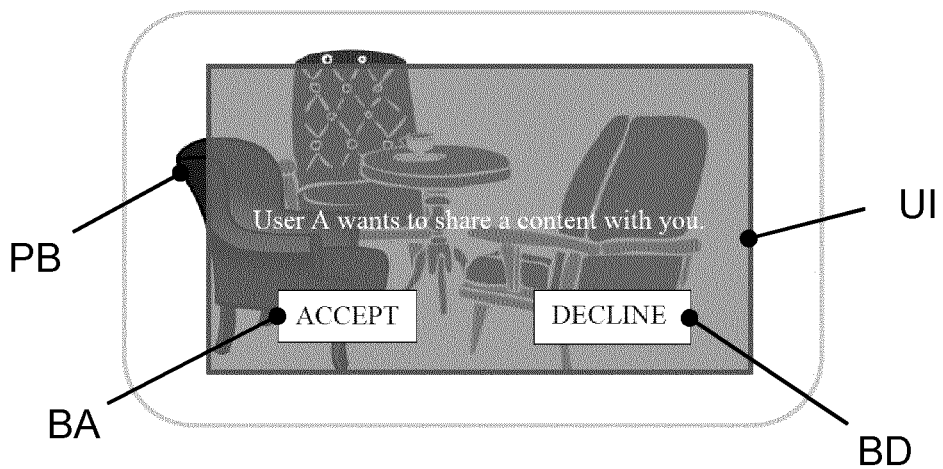
FIG. 7 illustrates examples of on screen information displayed to the second user notifying him that another user wants to share content with him.

The second user device DB generates a virtual user interface UI, which is composed of various layers of information. To notify the second user UB that the user UA wants to share a piece of content PA with him, an additional layer is created and displayed onto the screen of the device DB with "ACCEPT" and "DECLINE" buttons BA, BD to accept the sharing or not, as shown in FIG. 7A. This can be as simple as a 2D window displayed in the plane of the screen.

Figure 7B:
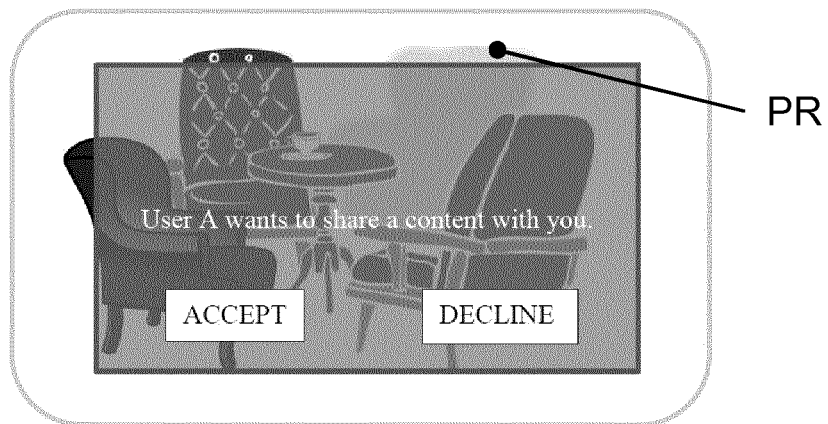

In another embodiment depicted in FIG. 7B a preview PR of the content to be shared is displayed simultaneously with the "ACCEPT"/"DECLINE" buttons. This preview of the content can be of low-resolution and can be displayed in a semi-transparent way.

Figure 7C:
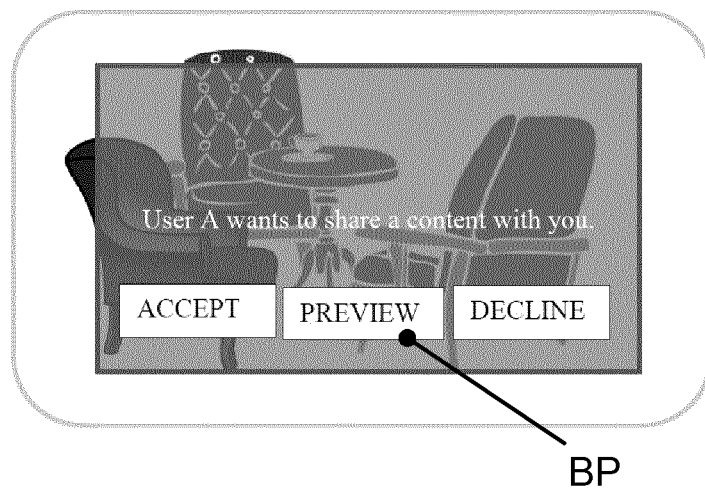

In an again other embodiment as shown in FIG. 7C, in a first step only a third button BP labeled "PREVIEW" is inserted between the "ACCEPT" and "DECLINE" buttons. In that case, the low-resolution and semi-transparent preview of the content to be shared is only displayed, if the "PREVIEW" button is pressed. After pressing the "PREVIEW" button, the preview is added, the "PREVIEW" button disappears and the "ACCEPT" and "DECLINE" buttons remain visible in order to allow the user to still decide whether to accept the sharing or not based on the displayed MR scene including the preview.

In an again other embodiment, which is not shown in FIG. 7, the 3D location of the content to be shared as well as the 3D location of the first user UA are shared with the second user device DB, and then projected onto the view of the second user device DB. Both projected locations are highlighted for some time, indicating to the second user UB where the first user UA and the content to be shared are. If the locations to be projected are out of the image boundaries, oriented arrows can be displayed close to the image boundaries.

Figure 8:
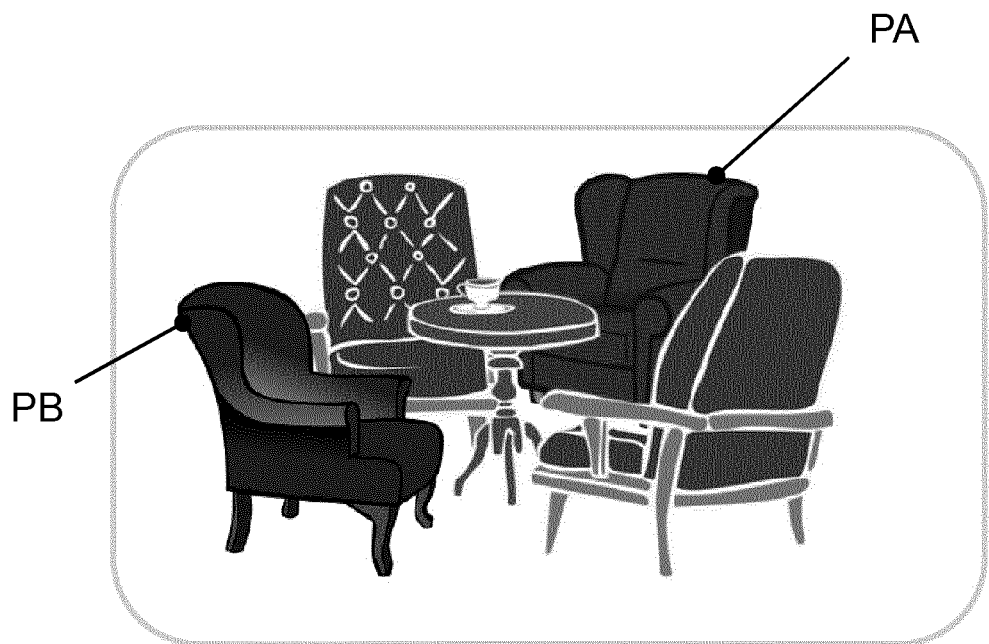
FIG. 8 illustrates a rendered MR scene shown on the display of a second user device after the second user has accepted the sharing.

FIG. 8 illustrates the rendered MR scene shown on the display of the second user device DB after the second user UB has accepted the sharing. The view now includes besides the real two armchairs and the coffee table, the virtually added armchair PB, inserted by himself, and the shared virtual armchair PA, inserted by the first user UA into the MR scene.

Figure 9:
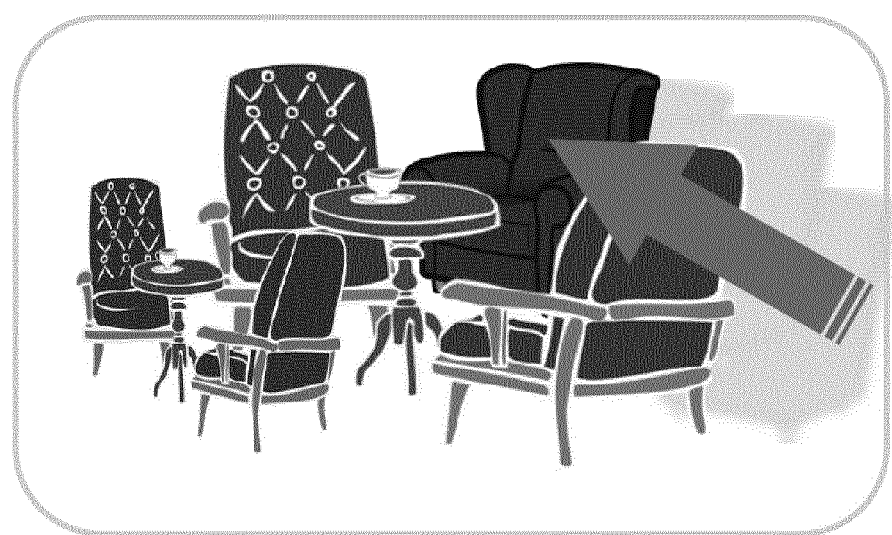
FIG. 9 illustrates an animation to generate an appearing effect for the shared content.

FIG. 9 illustrates an embodiment, in which the virtual content is not directly rendered with its final features, but an animation is created to generate an appearing effect. For example, for few seconds, a 3D trajectory from the location of the first user UA to the final location of the shared object PA is interpolated with successive displays along the trajectory. In the shown example, the 3D trajectory is a translation and the first user UA is not in the field of view of the second user UB. The translation starts from the right boundary of the display indicating to the second user UB that the first user UA is on his right. However, even though the 3D trajectory is symbolized in the figure by an arrow, it is not restricted to a translation but could have any curved shape. During the animation, the scale of the shared object can remain unchanged or can be interpolated from zero to the final scale.

Figure 10A:
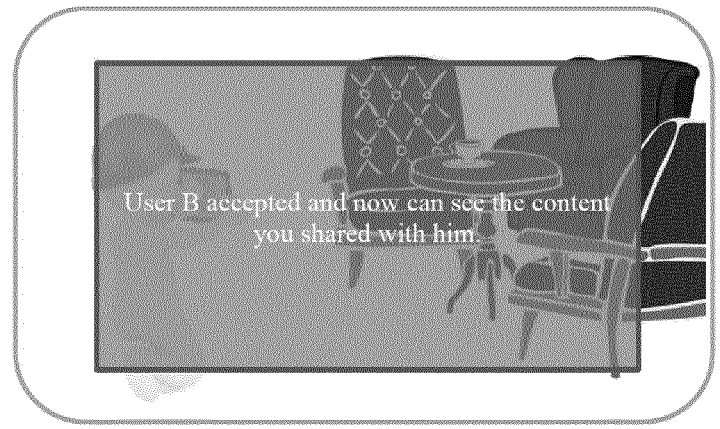
FIG. 10 illustrates an example of the rendering of a MR scene displayed on the first user device with an acceptance notification or using highlighting for notifying the first user.
Figure 10B:
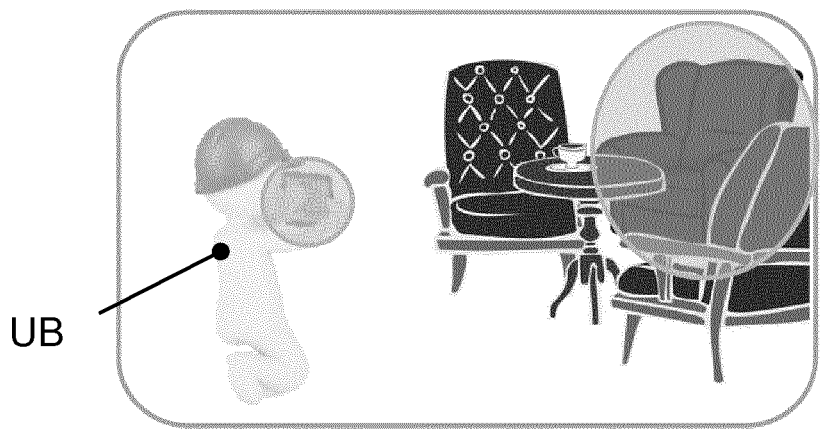

FIG. 10 shows embodiments of modifications of the graphical user interface displayed to the first user UA on the first user device DA. In the example depicted in FIG. 10A, a window with an on screen notification is displayed for some time on the screen of the first user device DA, having text notifying the first user UA that the second user UB accepted the sharing and now can view the MR scene including the shared content. Instead of overlaying a window, the acceptance or refusal can also be made visible to the first user UA by highlighting the second user device DB and/or the content to be shared for some time, as shown in FIG. 10B. For example, one or both of them can be given a certain color, like green if the sharing is accepted and red if declined. Using the known 3D location of the second user device DB and the content to be shared, one or both of them can be approximated by a 3D shape.

If the same content shall be shared with several users, this can be done simultaneously in a single gesture. In one embodiment; this can be done conveniently just by dragging the content to be shared over to all the users the content shall be shared with. In another embodiment, for this purpose the first user can form a closed contour so that every user whose projected position is inside this closed contour will receive the notification. To share the content in a single gesture with all users simultaneously, even including those who are not in sight, the first user can form a closed contour by dragging the content to the four corners of his screen.

Figure 11:
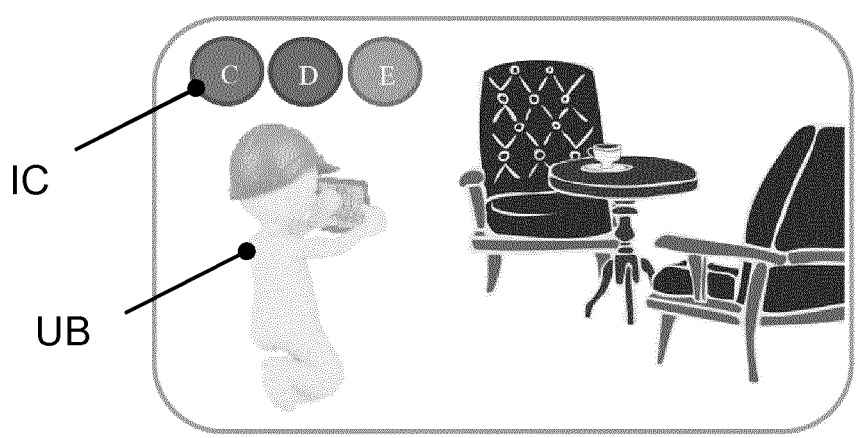
FIG. 11 illustrates a view on the MR scene, wherein some users are represented by icons.

In a further embodiment illustrated in FIG. 11, some or all users can be represented by small icons IC in a corner of the screen. In the depicted example, the second user UB is in sight, i.e. shown on the display of the first user device, whereas three further users C, D and E sharing the same MR scene are not visible and are, therefore, represented by the icons IC. By a simple drag & drop action on one of the icons, sharing of the content with the associated user can be launched. This variant allows to deal easily with the cases where some users are too far away from the first user and therefore the projection of their respective user device is too small, or where some users are occluded or not in the field of view. The display of such icons could even be dynamic, i.e. at a time instant the only displayed icons are the ones corresponding to users too far away or not visible.

In a further variant, the users are not all physically in the same room, but telepresence is used so that virtual clones of the remote users are displayed in the room. Furthermore, if in a VR environment some users wear a VR headset, the users may be represented by an avatar or another element in the VR scene.

In an embodiment, an apparatus for sharing virtual content in a mixed reality scene rendered on at least two user devices having different viewing positions and/or orientations onto the mixed reality scene, may include:
  means for enabling a user to select a virtual content to be shared and a second user device with whom the virtual content is to be shared; and
  means for providing information related to the virtual content to be shared to the second user device, wherein the provided information comprises the 3D position of the virtual content to be shared.

In some embodiments, the apparatus may also include:
  means for rendering the content to be shared on the first user device using the viewing position and/or orientation of the first user device and the 3D position of the content to be shared.

In some embodiments, the apparatus may also include:
  a touchscreen for displaying the rendered mixed reality scene including the content to be shared and for detecting a user input being a gesture performed by a user on the touchscreen.

In an embodiment, an apparatus for presenting virtual content in a mixed reality scene rendered on at least two user devices having different viewing positions and/or orientations onto the mixed reality scene, may include:
  means for receiving from a first user device information related to a virtual content in the mixed reality scene which is shared by the first user device with the second user device, wherein the received information comprises the 3D position of the virtual content to be shared; and
  means for rendering the shared virtual content with regard to the viewing position and/or orientation of the second user device onto the mixed reality scene.

Figure 12:
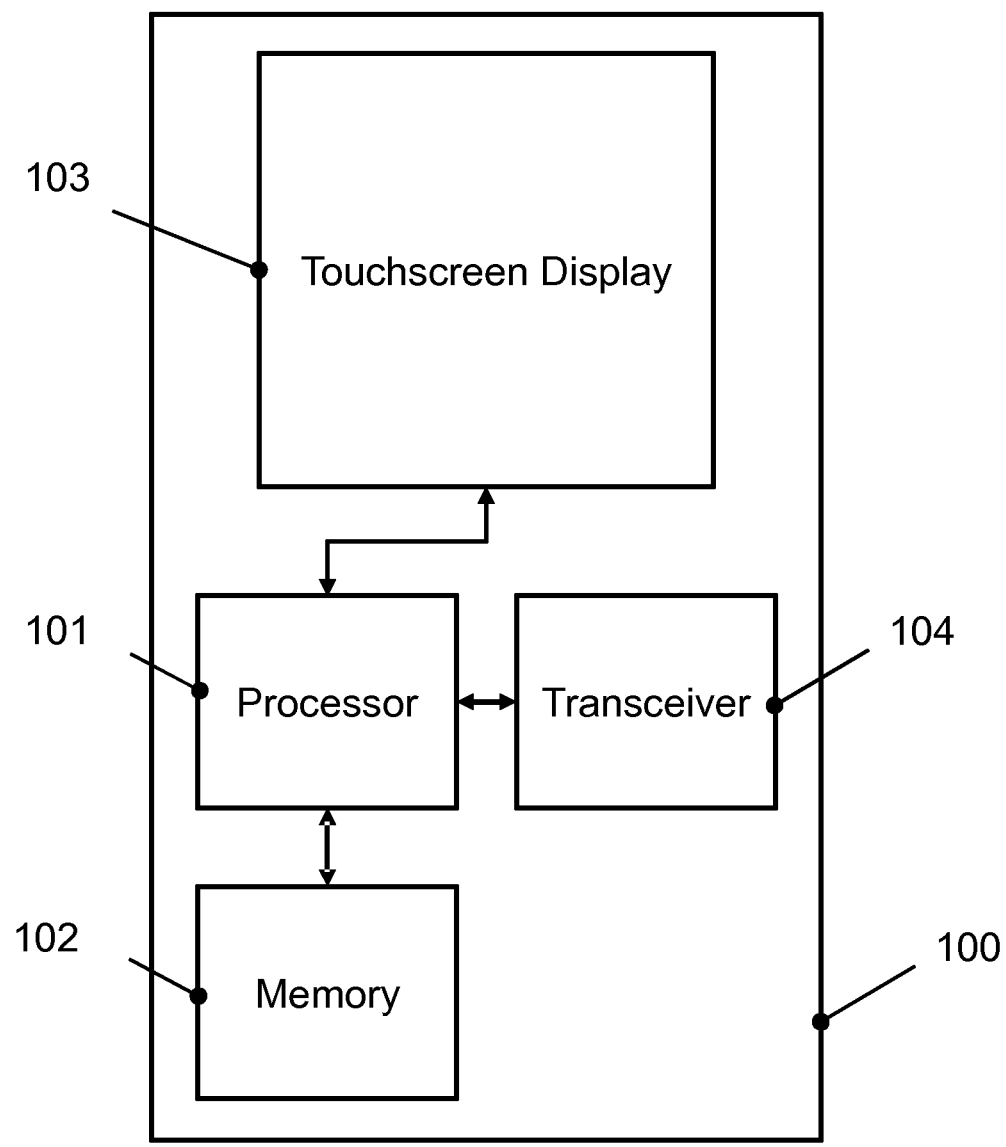
FIG. 12 illustrates a block diagram of an apparatus that is configured to enable sharing of mixed or virtual reality content.

A block diagram of an embodiment of an apparatus that is configured to enable sharing of mixed or virtual reality content is illustrated in FIG. 12. In some embodiments, the apparatus 100 might be a mobile device.

The apparatus 100 comprises a processor 101, which for example can be a central processing unit (CPU) or a graphics processing unit (GPU). The processor 101 is coupled to a memory 102, in which data and/or computer program instructions are stored. However, multiple processors and/or multiple memories may also be provided.

Furthermore, the apparatus 100 comprises a touchscreen display 103 coupled to the processor. The touchscreen display 103 allows the user to perceive visually the mixed or virtual reality content and to interact with the displayed content. The display part of the touchscreen display 103 may for example include a liquid crystal display or an organic light emitting display. For sensing the touch of a user, the touchscreen display 103 can use different technologies such as e.g. a resistive or capacitive touchscreen panel. In other embodiments, instead of the touchscreen, a display in combination with other input means such as mechanical buttons, a mouse, or a touchpad could be used as well.

A transceiver 104 is also coupled to the processor for a wireless or wired communication with other user devices. The transceiver may for example include a transmitter and receiver for signal transmission according to a mobile radio standard such as UMTS or LTE, or short range wireless transmission such as Wi-Fi, Bluetooth.

The invention claimed is:
1. A method of controlling access to virtual content in a mixed reality scene rendered on at least two user devices, the method comprising:
  enabling, at a first mixed reality (MR) device, a user of the first MR device to select a virtual content object displayed by a display of the first MR device;
  enabling, at the first MR device, the user of the first MR device to select a second MR device visible in the display of the first MR device,
  wherein the selected virtual content object was at least one of not previously displayed by the second MR device and not previously accessible to the second MR device; and responsive to at least one of: the user selecting the virtual content object, and the user selecting the second MR device, performing at least one of:
  displaying the virtual content object on the second MR device; and
  making the virtual content object accessible to the second MR device.

2. The method according to claim 1, wherein said enabling comprises receiving a user input for selecting the content to be shared in the rendered mixed reality scene.

3. The method according to claim 2, wherein the mixed reality scene rendered on the first MR device comprises the second MR device and/or a user of the second MR device and/or a graphical symbol representing the second MR device or user of the second user device and wherein said enabling comprises detecting a user input for selecting the rendered second MR device, user of the second MR device or graphical symbol in the rendered mixed reality scene.

4. The method according to claim 3, wherein the mixed reality scene is rendered on a touchscreen of the first MR device and the detected user input is a gesture performed by a user on the touchscreen.

5. The method according to claim 4, wherein the performed gesture comprises:
  selecting the content to be shared by touching the touchscreen at the location of the displayed content to be shared;
  dragging the selected content to the location of the rendered second MR device, user of the second MR device or graphical symbol; and
  sharing the selected content by dropping it onto the rendered second MR device, user of the second MR device or graphical symbol.

6. The method according to claim 3, wherein the second MR device and/or user of the second MR device is represented by a 3D shape.

7. The method according to claim 1, further comprising:
  receiving from the first MR device information related to a virtual content in the mixed reality scene which is selected by the first MR device with the second MR device; and
  rendering the selected virtual content with regard to a viewing position and/or orientation of the second MR device onto the mixed reality scene.

8. The method according to claim 7, further comprising:
  receiving a notification that the first MR device wants to share virtual content; and
  detecting a user input accepting or declining sharing of the virtual content.

9. The method according to claim 1, wherein the first and second MR devices exchange information via a server.

10. The method according to claim 9, wherein the first MR device, when being turned on, requests from the server at least one of the following data:
  a scene configuration of the mixed reality scene;
  position data for the current location of other MR devices; or
  a list of sharable virtual content.

11. The method according to claim 1, further comprising:
  rendering the selected virtual content on the first MR device using a viewing position and/or orientation of the first MR device and 3D position of the selected virtual content.

12. The method according to claim 1, wherein enabling the user to select the virtual content comprises enabling the user to select the virtual content object within the mixed reality scene using a touchscreen of the first MR device.

13. The method according to claim 1, wherein enabling the user to select the virtual content comprises enabling the user to select the virtual content object within the mixed reality scene using gaze detection by the first MR device.

14. The method according to claim 1, wherein enabling the user to select the virtual content and enabling the user to select the second MR device concurrently comprise enabling the user to use a drag and drop gesture.

15. The method according to claim 1, wherein enabling the user to select the second MR device comprises enabling the user to select the second MR device within the mixed reality scene using a touchscreen of the first MR device.

16. The method according to claim 1, wherein enabling the user to select the second MR device comprises enabling the user to select the second MR device within the mixed reality scene using gaze detection by the first MR device.

17. The method according to claim 1, wherein enabling the user to select the second MR device comprises enabling the user to select an icon displayed in proximity to the second MR device within the mixed reality scene displayed on the first MR device.

18. An apparatus comprising:
  a processor; and
  a non-transitory computer-readable medium storing instructions operative, when executed by the processor, to cause the apparatus to:
    enable, at a first mixed reality (MR) device, a user of the first MR device to select a virtual content object displayed by a display of the first MR device;
    enable, at the first MR device, the user of the first MR device to select a second MR device visible in the display of the first MR device,
    wherein the selected virtual content object was at least one of not previously displayed by the second MR device and not previously accessible to the second MR device; and
    responsive to at least one of: the user selecting the virtual content object, and the user selecting the second MR device, perform at least one of:
      display the virtual content object on the second MR device; and
      make the virtual content object accessible to the second MR device.

19. The apparatus according to claim 18, further comprising:
  a touchscreen configured to display the rendered mixed reality scene including the content to be shared and for detecting a user input being a gesture performed by a user on the touchscreen.

20. A method comprising:
  receiving from a first MR device information related to a virtual content in the mixed reality scene which is selected by the first MR device,
  wherein the received information comprises a 3D position of the selected virtual content; and
  rendering, onto the mixed reality scene, the selected virtual content with regard to the 3D position of the selected virtual content and a viewing position and/or orientation of a second MR device.

* * * * *